United States Patent

Kasai et al.

Patent Number: 6,068,112
Date of Patent: May 30, 2000

[54] CONVEYOR CHAIN

[75] Inventors: Kenji Kasai; Yasuharu Takashima, both of Nagoya, Japan; Tamotsu Matsuda, Penang, Malaysia

[73] Assignee: Toray Industries, Inc., Japan

[21] Appl. No.: 08/981,123

[22] PCT Filed: Mar. 29, 1996

[86] PCT No.: PCT/JP96/00864

§ 371 Date: Mar. 9, 1998

§ 102(e) Date: Mar. 9, 1998

[87] PCT Pub. No.: WO97/36806

PCT Pub. Date: Oct. 9, 1997

[51] Int. Cl.[7] .................................................. B65G 17/38
[52] U.S. Cl. ........................................ 198/853; 198/699.1
[58] Field of Search ................................ 198/850, 851, 198/853, 699.1

[56] References Cited

U.S. PATENT DOCUMENTS

| | | | |
|---|---|---|---|
| 2,732,867 | 1/1956 | May et al. | 198/699.1 X |
| 4,880,107 | 11/1989 | Deal | 198/853 X |
| 5,439,097 | 8/1995 | Takahashi et al. | 198/699.1 X |
| 5,628,393 | 5/1997 | Steeber et al. | 198/853 X |

*Primary Examiner*—James R. Bidwell
*Attorney, Agent, or Firm*—Austin R. Miller

[57] ABSTRACT

A reduced friction conveyer chain is used for conveying aluminum cans, glass bottles, PET bottles and other objects in a conveyer chain system where such objects are produced continuously. The conveyer chain is especially useful in the system where the objects being conveyed are slid on the surface of the chain and relatively thereto. Since the kinetic friction coefficient of the outer surfaces of the links, which constitute the conveyer chain and on which the objects to be conveyed are put, is reduced, the slidability of the links is improved, and the bottom surfaces of the objects being conveyed are prevented from being scratched.

10 Claims, 2 Drawing Sheets

CONVEYOR CHAIN

TECHNICAL FIELD

The present invention relates to a conveyer chain and, more precisely, to a conveyer chain capable of promoting the slidability of its outer surface on which objects are conveyed while reducing the damage of the bottom surfaces of the objects being slid.

BACKGROUND ART

In the conveyer system of continuously producing aluminium cans, glass bottles, PET bottles and others, conveyer chains are much used as the means of conveyance of such objects. This system of using conveyer chains includes the steps of stopping the stream of the objects being conveyed and drawing up them in order in the middle of the conveyance thereof, in which the objects must be slid on the conveyer chain relatively thereto in such steps of stopping the stream of the objects and drawing up them in order.

One example of promoting the slidability of the outer surface of such a conveyer chain is to employ chains made of resins. Heretofore, polyoxymethylene resins, polyetherimide resins or fluorine-containing resins have been used as the materials of the links for resin chains of conveyers. However, such plastic links are greatly worn away, as having poor hardness, and their life is therefore short. If graphite is added to such plastic links in order to enhance their hardness, their kinetic friction coefficient is lowered. However, the graphite added drops out due to friction to produce dust, which is problematic in that the dust is incorporated into the inside and the surface coats of the objects being conveyed to thereby worsen the quality of the objects and that the dust has some negative influences on the electronic circuits in the adjacent devices.

In practical conveyer system lines, a lubricant such as water or soapy water is applied onto the outer surfaces of conveyer chains to thereby promote their slidability. In general, however, since the outer surfaces of conventional conveyer chains on which objects are conveyed are flat (see Japanese Utility Model Application Laid-Open No. 57-49812), objects are conveyed thereon with their bottom surfaces being tightly attached on the outer surfaces of the conveyer chains. Accordingly, even if such a lubricant is applied onto the outer surfaces of the conveyer chains in order to promote their slidability, the lubricant is stripped off from the outer surfaces of the conveyer chains by the bottom surfaces of the objects being conveyed thereon, resulting in that the slidability of the outer surfaces of the conveyer chains is still insufficient.

If relatively hard, fine impurities, such as glass powder or metal powder, adhere to the outer surfaces of conveyer chains, such causes another problem in that the bottom surfaces of objects being conveyed on the conveyer chains are scratched by the fine impurities.

Therefore, the object of the present invention is to provide a conveyer chain capable of promoting the slidability of its outer surface on which objects are conveyed while reducing the damage of the bottom surfaces of the objects being slid.

SUMMARY OF THE INVENTION

The present invention provides a conveyer chain comprising a plurality of links linked endlessly to one another in such a manner that the front end of one link is movably linked to the back end of the adjacent link via a linking pin, which is characterized in that the outer surfaces of the links on which objects to be conveyed are located have a kinetic friction coefficient of less than 0.3 as measured in the test where an aluminium object is slid against the outer surfaces of the links at a pressure of 5 kg/cm$^2$ and at a peripheral velocity of the chain of 20 m/min.

In this condition, the slidability of the outer surface of the conveyer chain of the invention relative to the objects being conveyed thereon is promoted while the damage to the bottom surfaces of the objects being slid is reduced, when the conveyance of the objects is stopped and/or the objects are drawn up in order in the middle of the conveyance line.

As one embodiment of the conveyer chain of the invention, the outer surfaces of the links on which objects to be conveyed are put are formed to have thereon a plurality of small hills and grooves.

The plurality of small hills and grooves as formed on the outer surfaces of the links reduce the area of the outer surfaces to be kept in contact with the bottom surfaces of the objects being conveyed, thereby reducing the frictional resistance between them and improving the slidability of the outer surfaces of the links relative to the objects being conveyed. In addition, even if fine impurities with high hardness, such as glass powder and metal powder adhere on the outer surface of the conveyer chain of the invention, they are pushed by the bottom surfaces of the objects being conveyed into the grooves formed on the links whereby the bottom surfaces of the objects are prevented from being scratched by them.

Preferably, a lubricant is applied onto the outer surface of the conveyer chain of the invention on which objects to be conveyed are located. The lubricant is kept in the grooves formed on the links and is gradually released little by little toward the outer surface of the conveyer chain, by which the slidability of the outer surface of the conveyer chain is much more promoted. In addition, since the lubricant is so kept in the grooves and gradually released toward the outer surface, any continuous application of a large amount of lubricant as in conventional conveyer chains is unnecessary and only a small amount of lubricant may well be applied to the conveyer chain of the invention.

As another embodiment, the links of the conveyer chain of the present invention are made from a composition comprising a polyamidimide resin and a fluorine-containing resin.

The kinetic friction coefficient of the outer surface of the conveyer chain composed of such resin links is much reduced and, in addition, its critical PV value can be optimized. Moreover, since the resin links have high creeping resistance, the conveyer chain composed of these is neither elongated nor loosened. Therefore, it is unnecessary to artificially control the conveyer chain to prevent it from being loosened, and the labor for maintaining the conveyer chain can be saved.

Further, the present invention also provides the use of the conveyer chain mentioned above, which is characterized in that the objects being conveyed on the conveyer chain are slid on at least a part of the outer surface of the conveyer chain, relative to the outer surface of the conveyer chain being contacted with the objects.

In this use, the conveyer chain of the invention can specifically exhibit its characteristics while preventing the bottom surfaces of the objects being conveyed and slid thereon from being scratched.

BEST MODES OF CARRYING OUT THE INVENTION

The conveyer chain of the present invention comprises a plurality of links linked endlessly to one another in such a manner that the front end of one link is movably linked to the back end of the adjacent link via a linking pin, which is characterized in that the outer surfaces of the links on which objects to be conveyed are located have a kinetic friction coefficient of less than 0.3 as measured in the test where an aluminium object is slid against the outer surfaces of the links at a pressure of 5 kg/cm$^2$ and at a peripheral velocity of 20 m/min. Preferably, the kinetic friction coefficient is 0.29 or less, more preferably 0.20 or less.

The kinetic friction coefficient is of the outer surface of the conveyer chain on which objects to be conveyed are located, and is measured according to the method mentioned below.

Using a Suzuki-type abrasion tester, an aluminium object is slid against the outer surface of the conveyer chain on which objects to be conveyed are located, at a pressure of 5 kg/cm$^2$ and at a peripheral velocity of 20 m/min for a period of 1 hour, whereupon the kinetic friction factor of the outer surface of the conveyer chain is measured.

In the present invention, the shape of the conveyer chain and the material of the outer surface thereof on which objects to be conveyed are put must be selected in order that the kinetic friction coefficient of the outer surface of the conveyer chain can fall within the above-defined range. Though not specifically limited for this purpose, preferred are, for example, a chain composed of links each having a plurality of small hills and grooves as formed on their outer surfaces on which objects to be conveyed are located; the chain composed of such links, to which is applied a lubricant on its outer surface having such small hills and grooves; a chain composed of links, at least the outer surfaces of which to be contacted with the objects being conveyed are made from a composition comprising a polyamidimide resin and a fluorine-containing resin; and a chain composed of such links, at least the outer surfaces of which to be contacted with the objects being conveyed are made from a composition comprising a polyamidimide resin and a fluorine-containing resin, and which have a plurality of small hills and grooves as formed on their outer surfaces that are contacted with the objects being conveyed.

These chains are described in detail hereinunder.

First, the chain composed of links each having a plurality of small hills and grooves as formed on their outer surfaces on which objects to be conveyed are located is described in detail. In order to make it possible to more easily understand the chain of this type, the drawings attached hereto are referred to.

Figure 1:
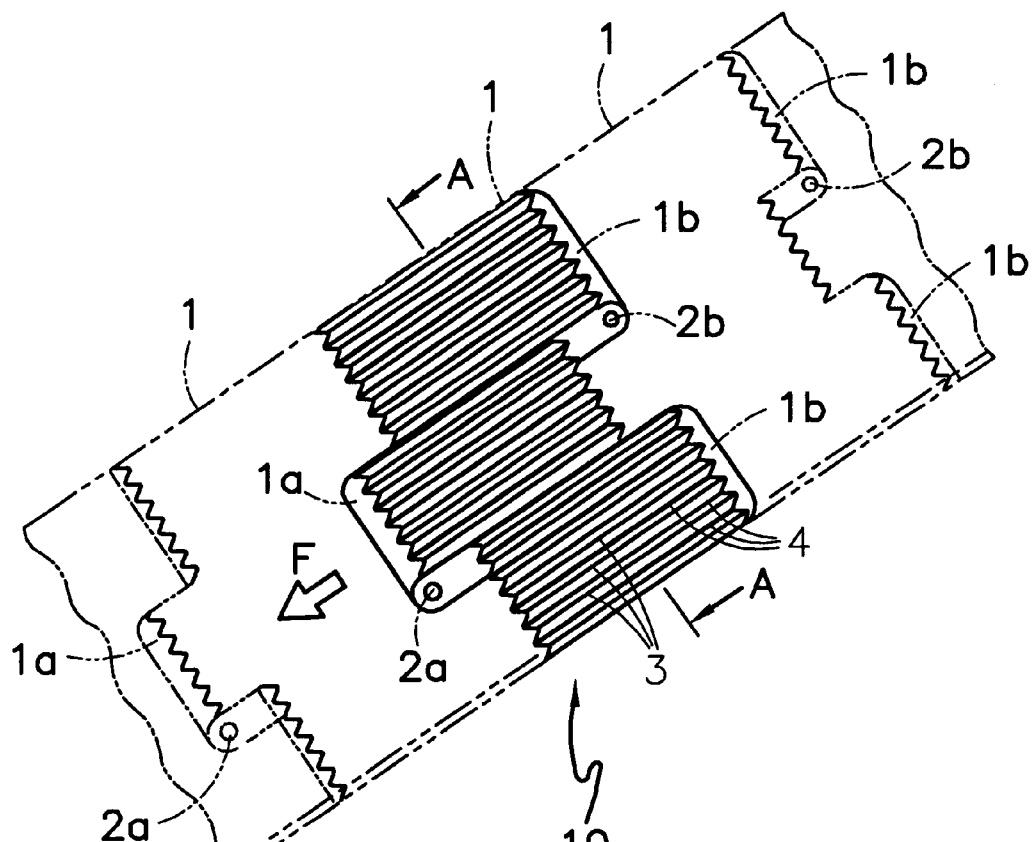
FIG. 1 is a perspective view partly showing one embodiment of the conveyer chain of the present invention, which has a plurality of small hills and grooves on its outer surface on which objects to be conveyed are put.

FIG. 1 is a perspective view partly showing one embodiment of the conveyer chain of the present invention, which has a plurality of small hills and grooves on its outer surface on which objects to be conveyed are located. In this, 1 is a link, on the outer surface of which are put objects to be conveyed. A plurality of these links 1 are endlessly linked to one another in line to constitute the conveyer chain 10 that moves in the direction of the arrow, F.

Each link 1 has a joint 1a at its front end in the center thereof in the widthwise direction and has a forked joint 1b, 1b at the both sides of the back end. The joint 1a is linked to the forked joint 1b, 1b of the adjacent link 1 between 1b and 1b. These joints 1a and 1b are provided with pin holes 2a and 2b, respectively, that pass therethrough in the widthwise direction, and a metal pin (not shown) is inserted into the holes, via which the adjacent links are relatively movable. Needless-to-say, in these links 1, the forked joint 1b, 1b may be at the front end of each link while the central joint 1a may be at the back end thereof. Each link 1 has on the entire outer surface thereof, on which objects to be conveyed are located, a plurality of long, small hills 3 and a plurality of long grooves 4 as formed alternately in parallel to one another and extending in the moving direction (that is, in the direction of the arrow, F). It is desirable that these hills and grooves are formed on the entire outer surface of each link on which objects to be conveyed are located, but it is not always necessary to form these on the entire outer surface. Depending on the kind of the objects to be conveyed on the conveyer chain, the small hills and the grooves may be partly formed on the outer surface of each link.

Figure 2:
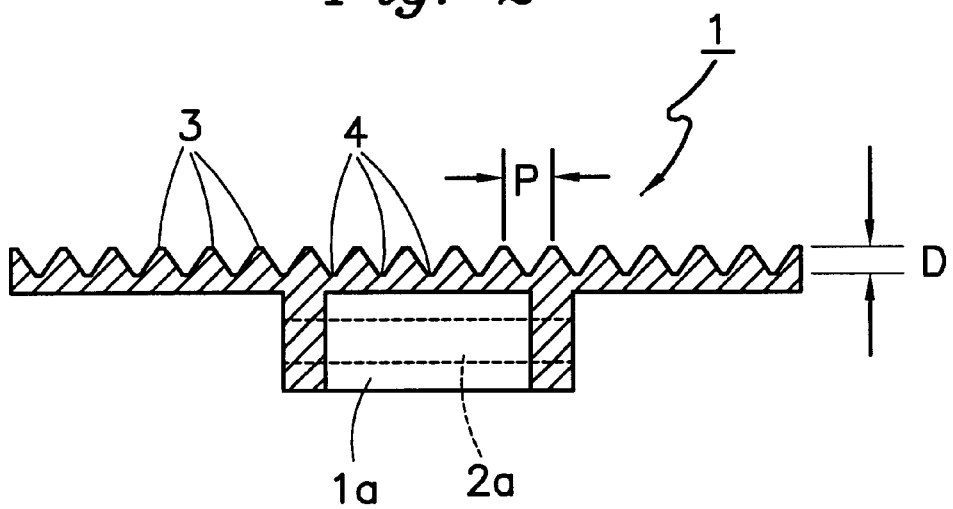
FIG. 2 is a cross-sectional view as taken along the A—A line of FIG. 1.
Figure 3:
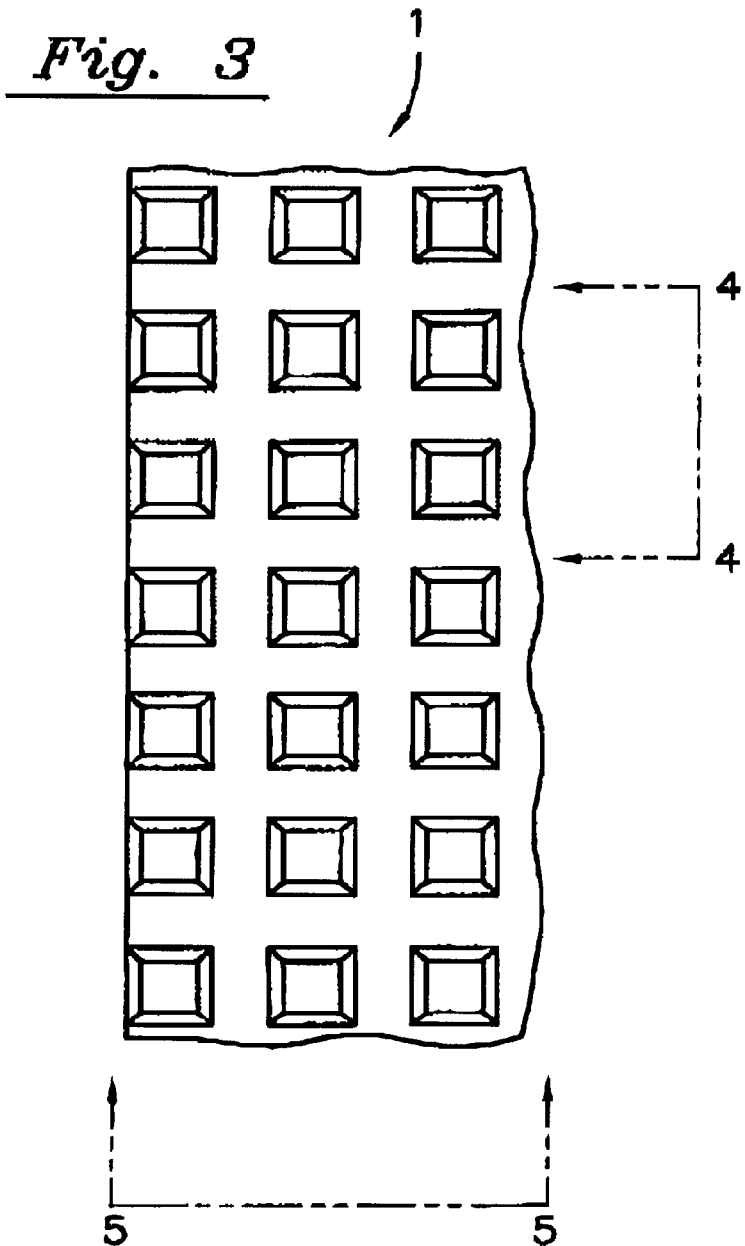
FIG. 3 is a partial plan view of a conveyor chain of the invention.
Figure 4:
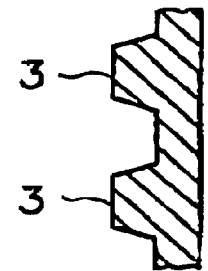
FIG. 4 is a partial cross-sectional view taken along line 4—4 of FIG. 3.
Figure 5:
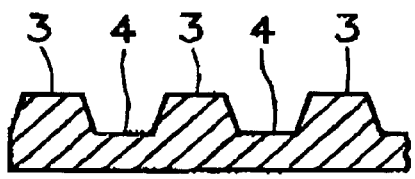
FIG. 5 is a partial cross-sectional view taken along line 5—5 of FIG. 3.

As in FIG. 2, the profile of the cross section of each small hill 3 is trapezoidal, while that of the cross section of each groove 4 is inverted-trapezoidal, and therefore the side walls of the small hills are inclined. Precisely, the profile of the cross section of each small hill 3 is tapered toward the outer surface of the link, while that of the cross section of each groove 4 is broadened toward it. With such profiles of the small hills and grooves, the outer surface of the link is waved in the widthwise direction thereof.

The shapes of these hills and grooves are not specifically defined, provided that the hills and grooves can constitute a structure capable of reducing the contact area between the outer surface of the link and the objects to be located thereon. Preferably, however, a plurality of long, small hills and a plurality of grooves are alternately formed on the outer surface of each link in its lengthwise direction. More preferably, these small hills and grooves are formed alternately while extending in parallel to one another in the moving direction of the conveyer chain. With such a structure, the conveyer chain can carry the objects being conveyed thereon. Apart from this, each link may have a plurality of long grooves that extend in the moving direction of the link and a plurality of long grooves that extend in the transverse direction relative to the moving direction, along with a number of independent small hills as surrounded by these grooves. Such a number of independent small hills in this case may be laid out at right angles like a checkerboard, or may be laid out in a zigzag pattern, or may even be laid out at random. In any case, it is desirable that the profile of the cross section of each of such long, small hills and independent small hills is substantially trapezoidal, while that of the cross section of each groove is substantially inverted-trapezoidal. It is also desirable that the height of each hill is substantially on the same level.

Regarding the relationship between the long, small hills 3 and the adjacent grooves 4, it is desirable that the pitch, P of the hills 3 sandwiched between the adjacent grooves 4 is from 0.5 to 2.0 mm, preferably from 0.8 to 1.5 mm, while the depth, D of each groove 4 is from 0.2 to 2.0 mm, preferably from 0.5 to 1.5 mm. The same shall apply also to the relationship between the independent hills and the grooves that surround the hills. That is, the pitch of the hills is desirably from 0.5 to 2.0 mm, more desirably from 0.8 to 1.5 mm, while the depth of each groove is desirably from 0.2 to 2.0 mm, more desirably from 0.5 to 1.5 mm.

With such small hills 3 and grooves 4 on the outer surface of each link, the contact area between the outer surface of the conveyer chain composed of such links and the objects being located thereon is reduced, whereby the frictional resistance between the chain and the objects is reduced, resulting in the improvement of the slidability of the outer surface of the conveyer chain relative to the objects being located thereon. In addition, even if hard, small impurities adhere onto the outer surface of the conveyer chain, the objects being located thereon shall drop the impurities into the grooves 4 while they slip on the conveyer chain. Therefore, the bottom surfaces of the objects being conveyed are not scratched by such impurities. In the present invention, the materials of the links are not specifically defined, provided that the kinetic friction coefficient of the outer surface of each link itself may fall within the defined range. Therefore, any known materials of, for example, metals, resins and ceramics can be used, but resins are preferred. The kind of the resins for use in the present invention is also not specifically defined. Employable are various thermoplastic resins and thermosetting resins, including, for example, polyacetal resins, polyether-imide resins, polyamidimide resins, polyimide resins, and liquid-crystalline polymers such as liquid-crystalline polyesters.

To these resins can be added, if desired, fluorine-containing resins, such as polytetrafluoroethylene, tetrafluoroethylene-hexafluoropropylene copolymers, polytrichlorofluoroethylene, and tetrafluoroethylene-perfluoroalkyl vinyl ether copolymers, and also lubricants, provided that such additives do not interfere with the objects of the present invention.

As the materials of the links having small hills and grooves on their outer surfaces, most preferred are compositions comprising polyamidimide resins and fluorine-containing resins, of which the fluorine-containing resin content is preferably from 0.3 to 40% by weight, more preferably from 5 to 30% by weight.

The materials of the metal pins are not also specifically defined and may include, for example, iron steel, stainless steel, resins, and ceramics.

It is also preferred to apply a lubricant onto the outer surfaces of the links on which objects to be conveyed are located. Preferred examples of the lubricants are water and soapy water.

The lubricant as applied onto the outer surfaces of the links is kept in the grooves formed thereon and is gradually released out onto the outer surfaces to cover them. Therefore, the slidability of the outer surfaces of the links can be improved more even when only a small amount of such a lubricant is applied onto the outer surfaces.

Next, the chain of the invention in which the outer surfaces of the links, on which objects to be conveyed are located, are made from a composition comprising a polyamidimide resin and a fluorine-containing resin is described in detail.

In this embodiment of the invention, the shape of each link is not specifically defined, provided that a plurality of the links are linked endlessly to one another in such a manner that the front end of one link is movably linked to the back end of the adjacent link via a linking pin to form a type of conveyer chain.

Since polyamidimide resins have excellent abrasion resistance, the life of the chain made from such resins is longer than that of the others made from other resins such as polyether-imide resins or polyoxymethylene resins. In general, the conveyer chain of the present invention is used while being hung over two or more sprockets under relatively high tension. Since polyamidimide resins have excellent creep resistance, the conveyer chain composed of these is neither elongated nor loosened. Therefore, it is unnecessary to artificially control the conveyer chain to prevent it from being loosened, and the labor for maintaining the conveyer chain can be saved.

Any known polyamidimide resins can be used in the present invention, including commercially-available ones such as, for example, "TI Polymer" produced by Toray Industries, Inc.

The fluorine-containing resins for use in the present invention include, for example, polytetrafluoroethylene, tetrafluoroethylene-hexafluoropropylene copolymers, polytrichlorofluoroethylene, and tetrafluoroethylene-perfluoroalkyl vinyl ether copolymers. Of these, preferred is polytetrafluoroethylene (PTFE). The amount of the fluorine-containing resin to be added is preferably from 0.3 to 40% by weight, more preferably from 5 to 30% by weight, of the total weight of the composition. The polyamidimide resin for use in the present invention may be combined with any other thermoplastic resins, provided that the additional resins do not interfere with the effects of the present invention.

The structure of the chain, of which at least a part of the outer surface is made from a resin composition comprising a polyamidimide resin and a fluorine-containing resin, can have not only a reduced kinetic friction coefficient at its outer surface but also even an optimized critical PV value. Using the chain, therefore, it is possible to smoothly slide objects on its surface even when no lubricant is applied thereto.

The method of making links for the chain from the composition comprising a polyamidimide resin and a fluorine-containing resin is not specifically defined. For example, employable is a method of injection molding to directly produce links, and also a method of first shaping rough bodies through extrusion or compression molding followed by cutting and finishing the bodies into links with desired shapes.

In the present invention where at least the outer surfaces of the links, on which objects to be conveyed are located, are made from the resin composition such as that mentioned above, the slidability of the outer surfaces of the links is improved. However, in order to prolong the life of the links, to save the labor for the maintenance of the links, to facilitate the shaping of the links through injection molding, and to simplify the structure of the links, it is desirable that the links are entirely made from the resin composition.

In addition, in order to further improve the physical properties, such as heat resistance and strength, of the links of the chain, it is desirable that the links are, after having been shaped, subjected to heat treatment. This is because shaped articles made from compositions comprising polyamidimide resins and fluorine-containing resins may have improved hardness, strength and heat resistance, if they are heat-treated. Therefore, the life of the chain composed of such heat-treated links may be much more prolonged. Where the links of the chain of the invention are produced through injection molding, they are generally heat-treated after having been shaped by injection molding. If the links are produced through extrusion or compression molding, it is desirable that the shaped bodies are heat-treated and thereafter cut into the links. However, such is not limitative. It is also possible either to first cut the shaped bodies into the links and thereafter heat-treat the thus-cut links, or to carry out the heat treatment both before and after the cutting step.

The heat treatment may be conducted at 200° C. or higher preferably at 150° C. or higher. The time for the heat treatment may be 12 hours or longer, preferably 24 hours or longer.

The combination of the formation of the plural small hills and grooves on the outer surfaces of the links and the use of the composition comprising a polyamidimide resin and a fluorine-containing resin as the material of the links can produce a conveyer chain having a much more reduced kinetic friction coefficient.

EXAMPLES

Example 1

Links for a conveyer chain each having long, small hills with a trapezoidal cross-sectional profile and grooves with an inverted-trapezoidal cross-sectional profile on their outer surfaces, on which objects to be conveyed are put, were produced through injection molding of a polyamidimide resin, TI-5013 (produced by Toray Industries, Inc.). In these, the hills and the grooves were formed alternately at a pitch of the hills of 1 mm and at a depth of the grooves of 1 mm.

A lubricant, soapy water was applied to the length, which were then subjected to a friction test using a Suzuki-type Abrasion Tester. In this test, an aluminium object was slid on the outer surface of the link, on which objects to be conveyed are located, at a pressure of 5 kg/cm$^2$ and at a peripheral velocity of 20 m/min, for 1 hour. As a result of this test, the kinetic friction coefficient of the outer surface of the tested link was found to be 0.19.

A plurality of these links were prepared. These were linked endlessly to one another, as in FIG. 1, to produce a conveyer chain. Soapy water was applied to this, and the conveyer chain which was used in a conveyer system line where many 350 ml cans were conveyed on the chain, whereupon the bottom surfaces of the cans being conveyed were visually observed as to whether or not they were scratched. In this test line, the percentage of the scratched cans was 8%.

Comparative Example 1

Links were produced in the same manner as in Example 1, except that their outer surfaces had neither hills nor grooves but were flat, and subjected to the same friction test. The kinetic friction coefficient of the outer surface of the tested link was 0.34, which was larger than that in Example 1. Using the Suzuki-type Abrasion Tester, the critical PV value of the link was measured, relative to the aluminium object, to be 200.

A conveyer chain was made of these links, which was then used in the same conveyer system line as in Example 1. In this test line, the percentage of the scratched cans was 18%.

Example 2

Links were made of an oil-containing polyacetal resin sheet, on the outer surfaces of which were formed long, small hills having a trapezoidal cross-sectional profile and grooves having an inverted-trapezoidal cross-sectional profile, alternately at a pitch of the hills of 1 mm and at a depth of the grooves of 1 mm. A lubricant, soapy water was applied to these. These were subjected to the same friction test as in Example 1 where an aluminium object was slid on their outer surfaces. As a result of this test, the kinetic friction coefficient of the outer surface of the tested link was 0.10.

A conveyer chain was made of these links, which was then used in the same conveyer system line as in Example 1. In this test line, the percentage of the scratched cans was 10%.

Example 3

Links each having the same shape as in Example 1 but having a flat outer surface were produced through injection molding of a composition of a polyamidimide resin, "TI Polymer" TI-5013 (produced by Toray Industries, Ltd.) containing 10% by weight of PTFE. These were subjected to the same friction test as in Example 1 under the same condition. As a result of the test, the kinetic friction coefficient of the outer surface of the tested link was found to be 0.15.

Using the Suzuki-type Abrasion Tester, the critical PV value of the link was measured, relative to the aluminium object, to be 1500.

These links were heat-treated at 260° C. for 96 hours, and then linked to one another via metal pins to obtain a conveyer chain. This conveyer chain was used in a conveyer system line, where cylindrical, 250 ml cans were conveyed on the chain with often sliding the cans relatively on the outer surface of the chain. In this, the chain running speed was 80 m/min. In this test line, the line ran well continuously for 3 months without applying any lubricant to the chain. No dust was formed due to the friction between the cans being conveyed and the surface of the chain, and the slidability of the outer surface of the chain was kept good. Even when the chain running speed was increased up to 120 m/min, the line still ran well continuously for 3 months.

Comparative Example 2

For comparison, a polyacetal resin was used and tested under the same condition as above. As a result, the kinetic friction coefficient of the outer surface of the link tested was found to be 0.30.

These rinks were linked to one another via metal pins to obtain a conveyer chain. This was used in the same line as in Example 3 where the chain running speed was 80 m/min. In this test line, however, the cans being conveyed frequently fell down. Therefore, it is difficult to use this conveyer chain in practical conveyer system lines.

Example 4

Links having the same shape and having the same hills and grooves on their outer surfaces as in Example 1 were produced through injection molding of a composition of a polyamidimide resin, "TI Polymer" TI-5013 (produced by Toray Industries, Ltd.) containing 10% by weight of PTFE. These were subjected to the same test as in Example 1, in which the kinetic friction coefficient of the outer surface of the tested link was found to be 0.15.

Using the Suzuki-type Abrasion Tester, the critical PV value of the link was measured, relative to the aluminium object, to be 1500.

These links were heat-treated at 260° C. for 96 hours, and then linked to one another via metal pins to obtain a conveyer chain. This conveyer chain was used in a conveyer system line, where cylindrical, 250 ml cans were conveyed on the chain with often sliding the cans relatively on the outer surface of the chain. In this test line, the chain running speed was 80 m/min. No dust was formed due to the friction between the cans being conveyed and the surface of the chain, and the slidability of the outer surface of the chain was kept good. In this, the line ran well continuously for 3 months without applying any lubricant to the chain. Even when the chain running speed was increased up to 120 m/min, the line still run well continuously for 3 months.

Industrial Applicability

As has been described hereinabove, the conveyer chain of the present invention is useful as the means of conveying aluminium cans, glass bottles, PET bottles and other objects in a conveyer system line where such objects are continuously produced. In particular, the conveyer chain is especially useful in a conveyer system line where the objects being conveyed are required to be intermittently stopped on the conveyer chain in the middle of the line. In addition, the conveyer chain of the invention is especially useful in high-temperature atmospheres where conveyer chains with high strength are required.

We claim:

1. A conveyor chain comprising a plurality of links linked endlessly to one another in such a manner that the front end of one link is movably linked to the back end of the adjacent link via a linking pin, wherein each link has an outer surface on which objects are conveyed, wherein the outer surface of each link has a plurality of small hills each having a trapezoidal cross section, and a plurality of grooves having a complimentary inverted trapezoidal cross section formed thereon and wherein the outer surface has a kinetic friction coefficient of less than 0.3 as measured in a test where an aluminum object is slid against the outer surfaces of the links at a pressure of 5 kg/cm$^2$ and at a speed of the chain of 20 m/min and wherein each of said plurality of links consist essentially of polyamidimide resin and a fluorine-containing resin wherein the fluorine content is from about 0.3 to 40% by weight of the total weight of the composition.

2. The conveyer chain as claimed in claim 1, wherein the links are produced through injection molding of a composition comprising a polyamidimide resin and a fluorine-containing resin followed by heat-treating the molded links.

3. The conveyer chain as claimed in claim 1, wherein the plurality of small hills and grooves are formed by alternately providing a plurality of long, small hills and a plurality of grooves therebetween.

4. The conveyer chain as claimed in claim 3, wherein the plurality of long, small hills and the plurality of grooves therebetween are formed alternately and in parallel to one another in the moving direction of the links.

5. The conveyor chain as claimed in claim 1, wherein the plurality of small hills and grooves are formed by providing a plurality of long grooves that extend in the moving direction of the links and said outer surface is further provided with a plurality of long grooves that extend in the transverse direction relative to the moving direction, thus defining a number of independent small hills each being surrounded by these grooves.

6. The conveyer chain as claimed in claim 1, wherein the links are produced by shaping a composition comprising a polyamidimide resin and a fluorine-containing resin through extrusion or compression molding, then heat-treating the shaped bodies, and cutting them into links.

7. The conveyor chain of claim 1, wherein the pitch of the long, small hills is from 0.5 to 2.0 mm.

8. The conveyor chain of claim 1, wherein the depth of the grooves is from 0.2 mm to 2.0 mm.

9. The conveyor chain as claimed in claim 1, wherein a lubricant is applied onto the outer surfaces of the links.

10. Use of the conveyer chain as claimed in claim 1, wherein the objects being conveyed on the chain are slid on at least a part of the outer surface of the chain and relatively to the outer surface thereof.

* * * * *